United States Patent
Limage et al.

[15] 3,643,676
[45] Feb. 22, 1972

[54] SUPERSONIC AIR INLET CONTROL SYSTEM

[72] Inventors: Charles R. Limage, Dallas, Tex.; Herbert P. Lindahl, Bellevue; Elling Tjonneland, Kent, both of Wash.

[73] Assignee: The United States of America as represented by the Administrator of the Federal Aviation Administration

[22] Filed: June 15, 1970

[21] Appl. No.: 46,082

[52] U.S. Cl. .............................................. 137/15.2, 137/81.5
[51] Int. Cl. ................................. F02k 11/00, F15c 1/08
[58] Field of Search ....................... 137/15.1, 15.2, 81.5

[56] References Cited

UNITED STATES PATENTS

| | | | |
|---|---|---|---|
| 3,163,981 | 1/1965 | Goodall | 137/15.2 |
| 3,460,554 | 8/1969 | Johnson | 137/15.2 |
| 3,507,296 | 4/1970 | Fix | 137/81.5 |
| 3,495,605 | 2/1970 | Gunnarson | 137/15.2 X |

*Primary Examiner*—Alan Cohan
*Attorney*—Glenn Orlob and Kenneth W. Thomas

[57] ABSTRACT

A fluid flow stabilizing and terminal or normal shock wave stability control system, utilizing fluidic vortex throttling valves can be integrated with the intake of a jet propulsion power plant, to attenuate gust disturbances and the intake's terminal or normal shock wave movement, thereby preventing unstart or undesirable terminal shock wave expulsion from the intake during transonic or supersonic mode. Further, the vortex valve terminal shock stability system can be used for preventing unchoking of the intake during a noise abatement mode of operation, wherein the shock wave is positioned within the intake forward of the engine section to prevent the engine compressor noise from passing out through the cowl entrance. The vortex valve shock stability system can also stabilize buzz for mixed, internal, or external compression intakes.

8 Claims, 18 Drawing Figures

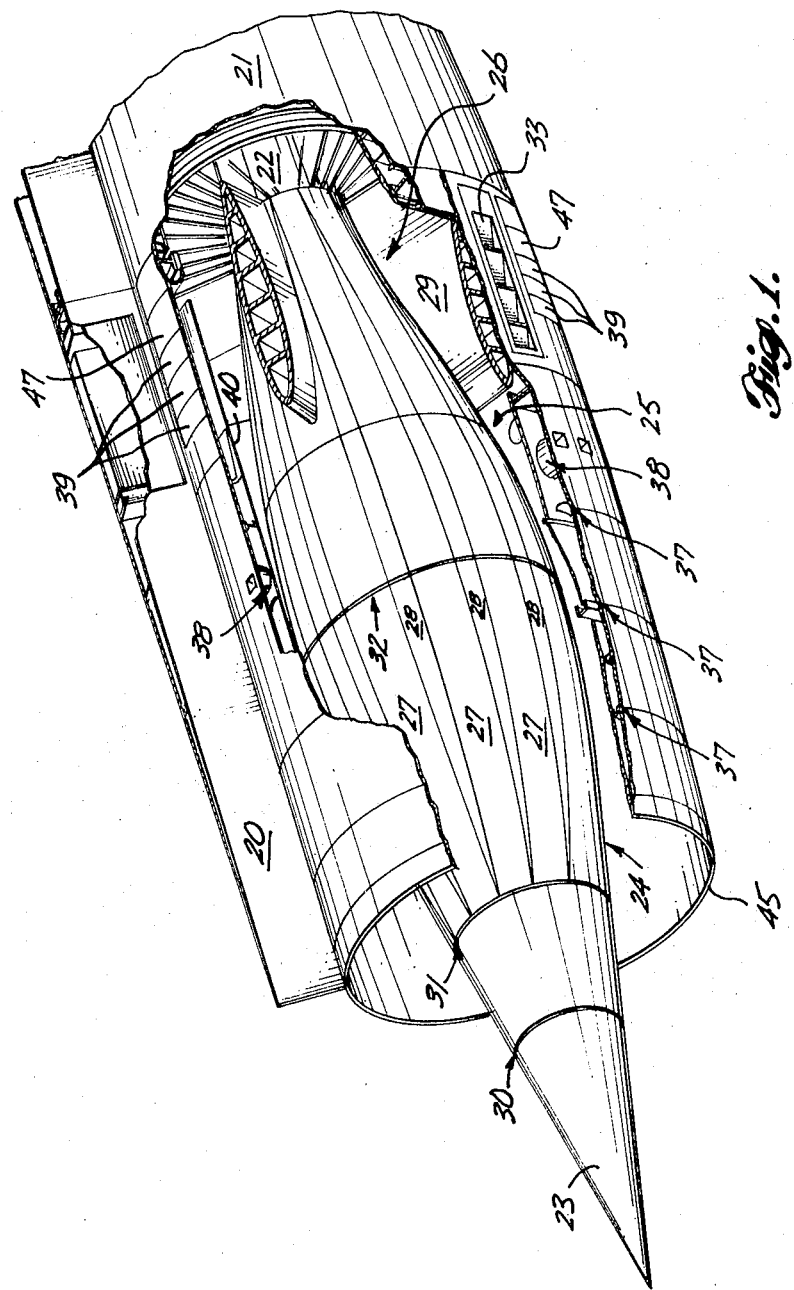

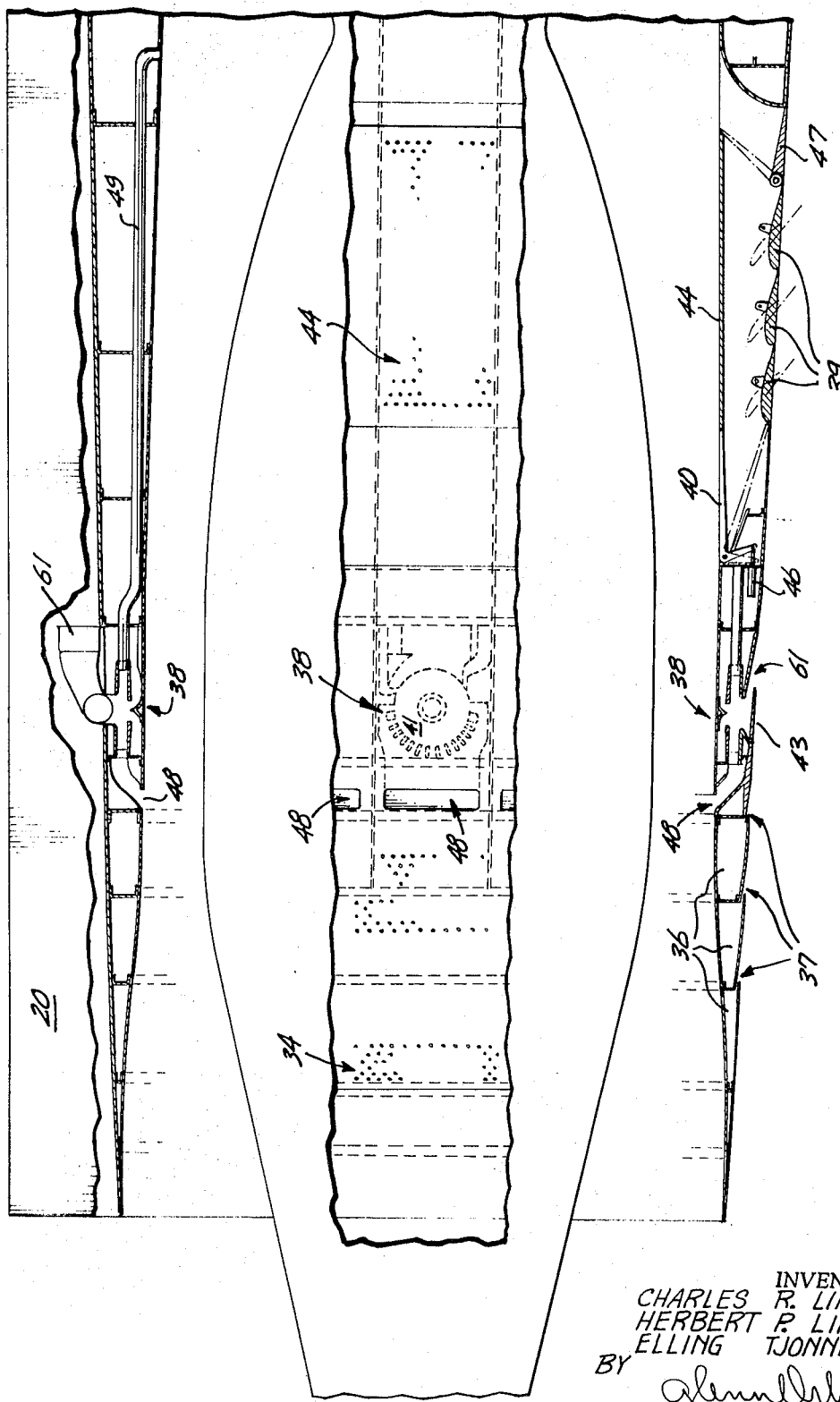

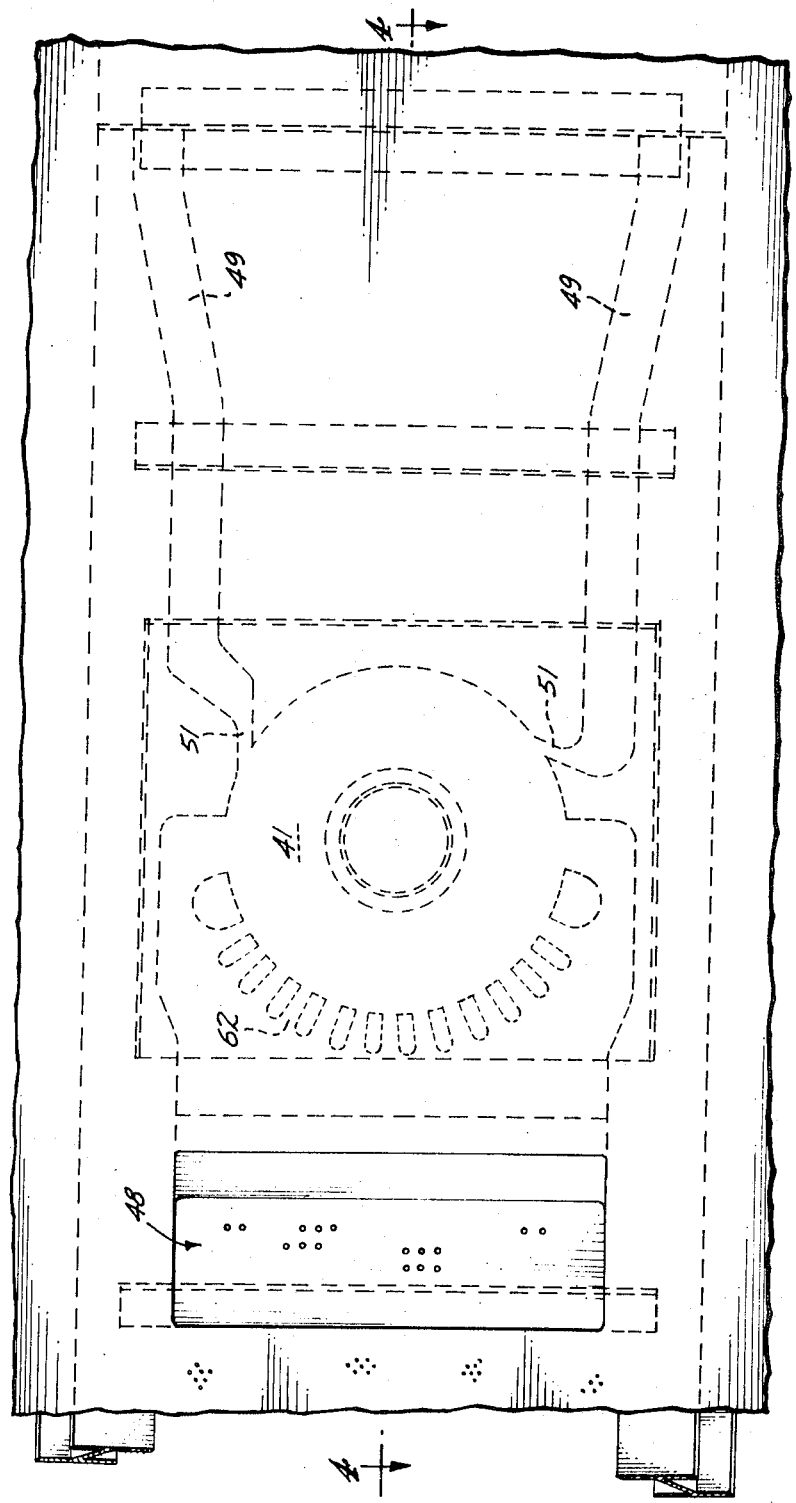

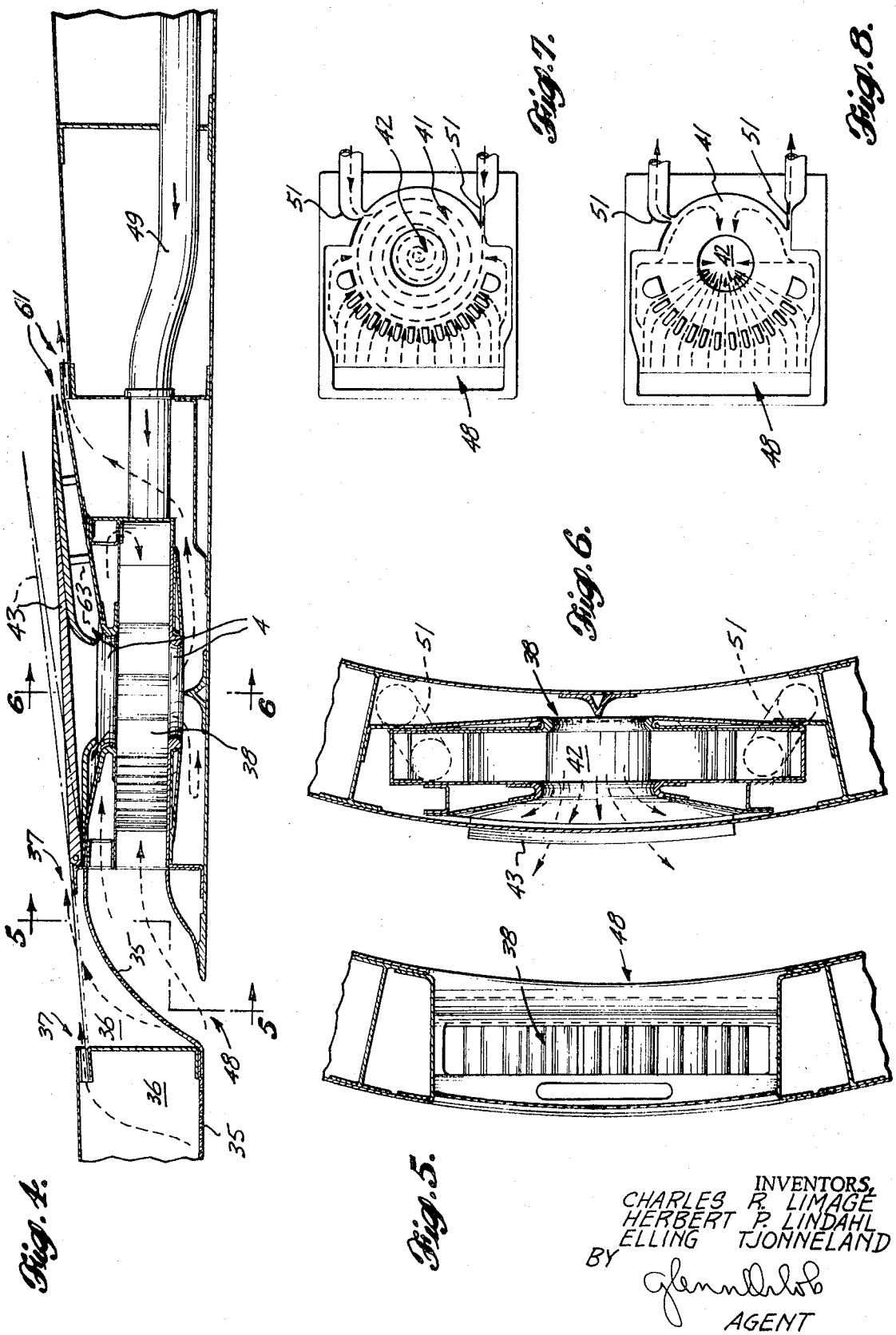

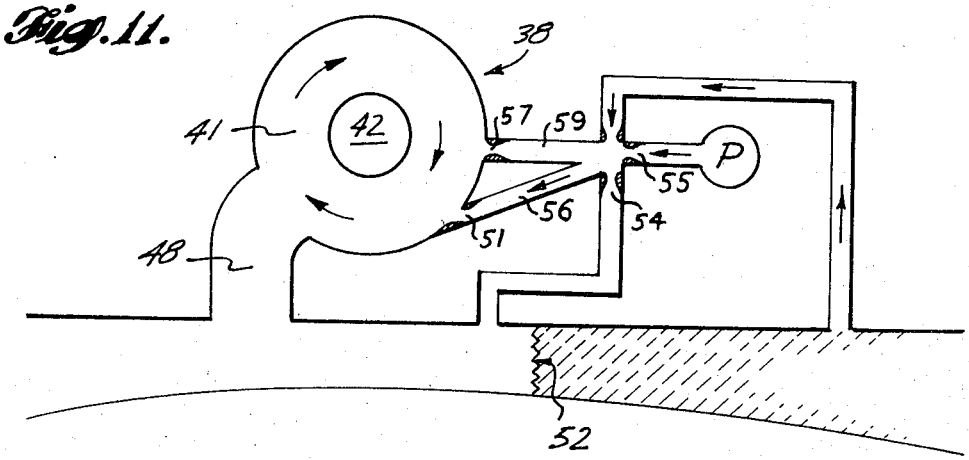

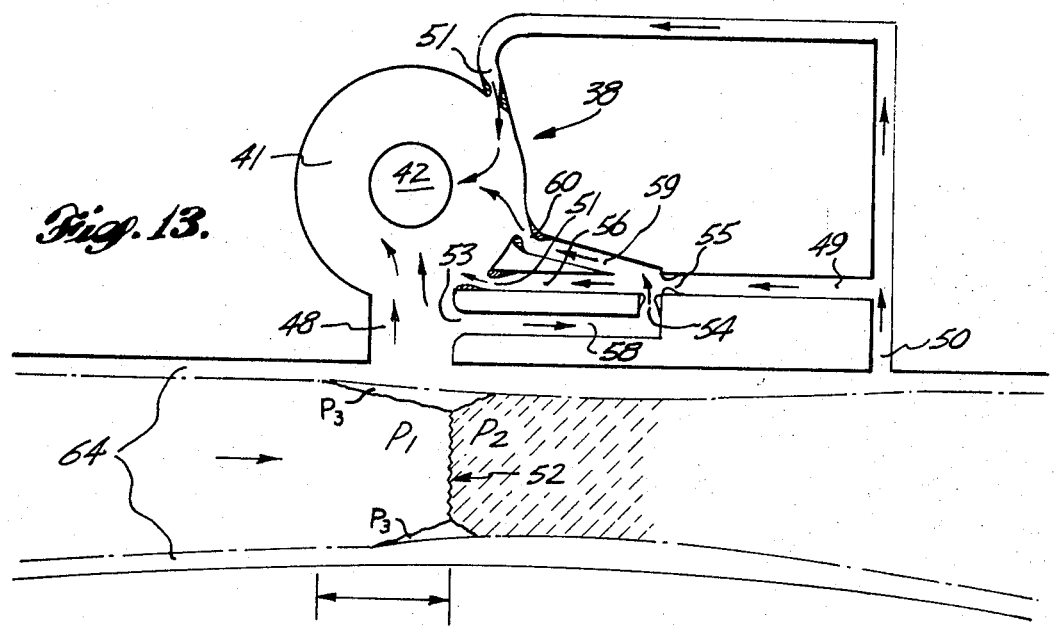
Fig. 13.
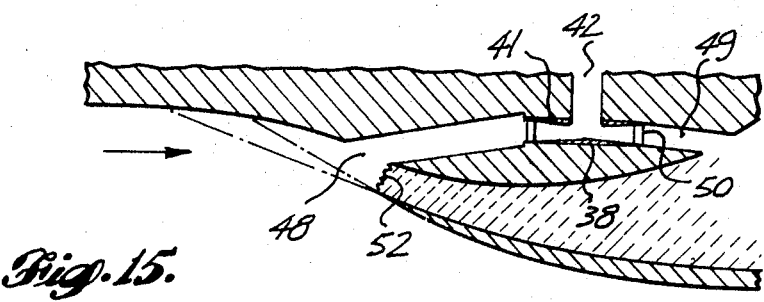
Fig. 14.
Fig. 15.

SUPERSONIC AIR INLET CONTROL SYSTEM

The invention described and claimed herein resulted from work done under United States Government Contract FA-SS-67-3, and the United States Government has an irrevocable, nonexclusive license to practice and have practiced the invention claimed herein, including the unlimited right to sublicense others to practice and have practiced the claimed invention for any purpose whatsoever.

FIELD OF THE INVENTION

In a jet propulsion power plant system, the fluid intake section, the intake fan, compressor, duct burner, exhaust nozzle, and the power plant controls in general, are all involved in a complex interplay when fluctuating or nonsteady fluid flow condition or transient flow effects are considered. Also, the terminal shock wave stability within the fluid intake is directly related to the maintenance fluid mass flow continuity through the intake system. To preserve continuity of fluid mass flow through the intake, the fluid mass flow captured by the intake must be discharged from propulsion system. It is desirable that the fluid leaving the intake section be stable and of high quality so as to insure desirable engine performance characteristics.

Fluid flow conditions can exist within the intake section such that a strong oblique, normal or terminal shock wave is formed within the geometrical throat section of the intake or slightly downstream thereof. If an external or internal fluid flow disturbance occurs which upsets the fluid mass flow continuity balance through the propulsion system causing less flow to be demanded from the intake than is being supplied, the terminal shock wave is forced to move upstream and the throat Mach number may decrease towards unity. In an internal or mixed compression intake, if the terminal shock wave is forced to move upstream further than the minimum aerodynamic throat section of the intake, undesirable performance characteristics can occur in terms of quality and stability of the fluid entering and leaving the intake.

In the external compression mode, terminal shock wave instability or buzz can occur, due to the terminal shock wave boundary layer interaction.

When the intake is operated in the subsonic noise abatement mode, noise from the engine and its compressor section can be prevented from traveling upstream and out its opening by choking the throat of the intake. The terminal shock wave of the intake should be maintained at or slightly downstream of the aerodynamic throat section in order to insure noise abatement. The intake's terminal shock wave should also remain stable in order to prevent fluid flow distortion and an undesirable quality of fluid from arriving at the engine face.

Fluid flow distortion through the intake can affect the fan performance, duct burner operation, and exhaust nozzle control; and conversely, lead to disturbances which can feed back through the power plant and influence the engine air compressor section and the fluid intake system. The burner ducts, combuster control, and exhaust nozzle instability can also create fluid pressure pulses which can be transmitted forward through the power plant to affect the compressor and intake. Further, the compressor stall margins can be significantly reduced by these fluid flow instability effects resulting in intake unstarts. Engine fluid flow control sensors are also affected by intake distortion and turbulence which feeds through the engine compressor fan into the fan duct and upsets the engine control system. The successful solution to the dynamics of the engine and fluid intake, in conjunction with power plant fluid mass flow matching, lies in the stabilization system for the terminal shock wave and the application thereto of the pure fluid vortex throttling valve system of the present invention.

SUMMARY OF THE INVENTION

The invention relates to a fluidic vortex throttling valve integrated with a fluid intake for a gas turbine, or other flow through propulsion system, to control the terminal or normal shock wave position within the intake section; and, more particularly, to a fluidic vortex amplifier valve for maintaining intake terminal shock wave stability during transient fluid flow fluctuations in either the mass flow being supplied to or demanded from the intake.

Integrating a fast responding vortex valve terminal shock control system with a power plant's supersonic fluid intake, allows the intake to tolerate transient fluid flow disturbances, such as tail gust, throttle chop, etc., which could otherwise lead to an intake "unstart" condition. An intake "unstart" condition can occur in a mixed compression, supersonic intake, due to an imbalance of the mass flow supplied to and demanded from the intake, which results in a reduction of the amount of mass flow demanded of the intake to an amount below that of the supply of mass flow captured. The mass flow imbalance causes the terminal shock wave to move upstream toward the instake's throat. If the mass flow imbalance is sufficiently large, the terminal shock wave will continue its movement upstream until it is expelled from the captured fluid intake opening, i.e., an unstart. An intake "unstart" can also occur if the intake's throat Mach number is allowed to drop to unity. The throat Mach number is sensitive to fluid flow disturbances occurring upstream of the intake opening and these disturbances can result in either raising or lowering the effective Mach number of the fluid flow entering the intake. If the effective Mach number of the fluid entering the intake opening is lowered, and no adjustment is made to the area contraction ratio of the intake, the throat Mach number would also be lowered. Should the throat Mach number drop to unity, the intake will go to an unstart condition even though the terminal shock wave may have been initially positioned well downstream of the minimum aerodynamic throat section.

In the case of a downstream flow disturbance to the intake, an unstart condition can be avoided if the excess mass flow from the intake is routed overboard before it reaches the face of the engine. In the case of a flow disturbance occurring upstream of the intake's opening resulting in a decrease of the effective Mach number of the fluid flow being captured by the intake, an intake unstart condition can be avoided by removing the excess mass flow from the intake before it reaches the throat section. In the event of a flow disturbance resulting in an imbalance in the sum of the mass flow demand of the engine relative to the mass flow being supplied to the engine or a choked throat the incorporation of the vortex valves in the fluid intake system in accordance with the teachings of the present invention would generally stabilize the terminal shock wave position. Whereas, if the vortex valves were absent, the terminal shock wave would move upstream past the minimum aerodynamic throat section and be expelled from the intake due to the failure of promptly bypassing the excess flow overboard from the throat section through the vortex valves. The amount of mass flow bypassed through the vortex valves is limited only by the restrictions imposed on the design of the intake and the aircraft compatibility therewith. As the flow disturbance to the intake is reduced, the required amount of intake bypass flow is likewise reduced. Should the mass flow disturbance to the intake exceed the maximum bypass flow capacity of the vortex valves, they would still function to attenuate the shock wave motion for a period of time which should be sufficient for the additional fluid flow control devices that are generally incorporated into the total system, to provide the necessary corrective amount of flow bypass to avoid shock expulsion.

The vortex valve shock stabilization system also effectively increases buzz stability levels for both the external compression and the mixed compression, i.e., internal-external compression intakes. In addition, the vortex valve stability system can be used as a normal shock stability device for intakes requiring a choked throat for noise abatement.

Essentially, the terminal shock stability system comprises a vortex valve which is a pure fluidic device employing no moving parts and utilizing the principle of angular momentum to provide a large fluid mass flow gain. The vortex valve consists of a vortex chamber, a central exit port located at the center of vorticity of the vortex flow within the chamber, a primary bleed entry channel for directing a radial flow into the chamber, and a secondary control flow entry channel for directing a tangential flow into the chamber for producing a vortex. The primary and secondary channels enter the vortex chamber at its outer periphery. The primary elastic fluid bleed port is located in the intake upstream of the steady-state, terminal shock location and either upstream, straddling, or downstream of the intake's geometric throat section depending on design considerations. The primary bleed port communicates directly with the peripheral entry channels of the vortex chamber. The vortex valve secondary bleed port for control fluid flow, which communicates with a pressure source higher than the primary bleed port pressure is channeled into the vortex chamber for producing a vortex. The secondary fluid source can be derived from the intake downstream of the terminal shock, or from a region of pressure higher than the steady-state primary bleed port pressure, or from some other relatively high-pressure fluid source such as an engine compressor stage. During steady-state conditions, prior to an intake flow disturbance, the secondary flow traverses the vortex chamber towards the central exit port in the form of a vortex; and thereby, through the principle of angular momentum, provides a radial, positive pressure gradient across the vortex chamber, with the pressure increasing from the central exit port to the outer periphery of the vortex chamber. The amount of secondary bleed for control flow is maintained so as to establish a pressure at the outer periphery of the vortex chamber, equal to or greater than the pressure existing across the primary bleed port communicating from the intake, to throttle or block the fluid flow from passing through the intake's primary bleed port and vortex valve.

The vortex valve stability system stabilizes the terminal shock by reacting to a pressure rise on the intake's fluid flow boundary surfaces caused by an intake fluid mass flow imbalance from an external or internal flow disturbance. A disturbance to the intake's fluid mass flow can occur that forces the normal or terminal shock to move upstream in the intake. This type of disturbance results from less fluid being demanded from the intake than is being supplied by the intake. The primary bleed port of the vortex valve stability system is located in such a place in the intake that the terminal shock can crossover the intake port when such a disturbance occurs. The pressure rise available across the terminal shock is made to pressurize the primary bleed port and overcome the back pressure provided by the swirl in the vortex valve. This results in the vortex valve bleeding the excess intake fluid, thereby stabilizing the terminal shock. A disturbance to the intake's fluid mass flow can also occur which results in decreasing the intake's throat Mach number towards unity. For example, if the effective Mach number of the fluid flow entering the intake is lowered and no adjustment is made to the intake area contraction ratio, the throat Mach number is also lowered. If the intake's throat Mach number drops to unity, the intake will unstart even though the intake's terminal shock may be positioned far downstream of the intake's throat. Accompanying a decrease in duct Mach number is a corresponding increase in the intake duct static pressure. By locating the primary bleed port of the vortex valve stability system in such a place in the intake to be able to utilize the pressure rise phenomenon from the upstream disturbance, the excess fluid captured by the intake can be bled overboard through the vortex valves before it reaches the intakes'throat, thus stabilizing the terminal shock, preventing throat choking, and preventing intake unstart or buzz. In summary, the vortex valves, in accordance with this present invention, perform the function of bleeding excess intake elastic fluid overboard, in the event of an intake fluid mass flow imbalance.

The advantage of the vortex valve terminal shock stability system is to provide throttling of the intake stability bleed with no moving parts while requiring only a small amount of vortex valve bleed for its operation during normal, steady state conditions. Since only a small amount of secondary bleed for control fluid flow is required to throttle the primary bleed port flow, a much larger bleed flow increased through the intake's primary bleed port can be realized for the same pressure rise, by utilizing vortex valves compared to a stability system employing no throttling valves. A mechanical, servo-controlled throttling valve could conceivably perform the same function as the vortex valve at a lesser efficiency, but moving parts would be required along with a conventional, closed-loop control system. The fluidic terminal shock stability systems incorporating the vortex valve should be completely reliable since it does not require any moving parts for its successful operation and since its performance depends completely on only the proven laws of thermodynamics.

One of the objects of the present invention is to prevent the unstart of a supersonic fluid intake due to transient, external or internal, fluid flow disturbances when the total fluid flow demand of the power plant, including the bypass flow downstream of the minimum aerodynamic throat section, is relatively less than the captured fluid mass flow minus the bypass flow upstream of the throat.

Another object for a geometrically controlled variable throat section intake is to make the response of the throat bypass control means rapid enough to shock wave movement that the main fluid flow bypass system, including the controller for geometrically varying the throat section, can keep ahead of the larger fluid flow disturbances, i.e., those in excess of the vortex valve bypass flow capacity.

Another object is to increase the efficiency and reliability of a fluid intake control system over that of a system utilizing servo controlled mechanical valves through the use of an all-fluidic response system.

Another object is to increase the buzz stability of an elastic fluid intake during the supersonic external compression mode by utilizing the pressure rise across the terminal shock wave to bleed fluid from the intake.

Another object is to maintain a stable position for the terminal shock wave in those intakes requiring a choked throat for noise abatement.

Another object is to provide essentially instantaneous terminal shock stabilization by utilizing the differential pressure available within the intake, without assistance from any other sources and without moving parts.

One of the advantages of using the vortex valve terminal shock stability system of the present invention in intakes of the type comprising: internal compression, a mixed compression, an external compression, or an intake operating subsonically with a choked throat for noise abatement, is that internal fluid flow disturbances can be controlled by the differential pressure across the terminal shock wave without assistance from the main fluid flow bypass control system which generally includes mechanical actuating devices for varying the geometrical throat section.

Another advantage is that throat bleed to the vortex valve functions to reduce boundary layer thickness associated with the forward movement of the terminal shock wave to its critical position and, in so doing, helps to maintain the intake's inherent design Mach number tolerance when there is an upstream disturbance. This boundary layer thickening causes throat choking and also more frequent unstarts due to fluid disturbances upstream from the throat section.

Another advantage is that it can increase the intake's tolerance to and prevent unstarts caused by external airflow disturbances, e.g., angle of attack and/or yaw changes, tail gusts, clear air turbulence, passing airplanes, etc., which result in lowering the intake's throat Mach number towards the unstart limit of unity. The pressure rise associated with the intake's duct Mach number decrease is utilized by the vortex valve stability system to bleed fluid upstream of the throat to prevent intake throat chocking.

Another advantage is that it can increase the intake's tolerance to, and prevent intake unstarts caused by, external or internal airflow disturbances when the total elastic fluid demand from the intake is less than the air mass flow supplied by the intake, by utilizing the pressure rise across the normal or terminal shock wave as it is forced to move upstream in the intake flow channel toward the intake's throat, thereby bleeding the excess fluid from the intake before it reaches the intake's exit.

Another advantage is that the vortex valves provide for a faster engine restart capability by reducing the amount of throat flow area and the intake flow boundary surface movement required for the restart. Depending on intake design and vortex valve stability bleed system mass flow capacity, the vortex valve shock stability system could enable the intake to be self-starting without movement of aerodynamic control surfaces.

Another advantage is that by integrating a vortex valve terminal shock wave stability system into a gas turbine intake, it enables the intake to be continuously operated at a higher performance and reliability level than compared to an intake propulsion system utilizing only a standard intake control system that requires physical movement of fluid control surfaces. This is due to the inherently rapid response characteristics of the vortex valve shock stability system to fluid flow fluctuations.

BRIEF DESCRIPTION OF THE DRAWINGS

FIG. 1 is a perspective view of a mixed compression, supersonic fluid intake for a jet engine, with parts being broken away to reveal the variable diameter centerbody for varying the throat area, the vortex valves of the present invention and other internal structure.

FIG. 2 is an enlarged side view of the fluid intake shown in FIG. 1 depicting the vortex valves and other structure.

FIG. 3 is an enlarged plan view of a vortex valve in the intake section shown in FIG. 2 looking from the interior of the intake to the exterior.

FIG. 4 is a side view transverse section through the vortex valve taken on line 4—4 of FIG. 3 with the intake interior toward the bottom and the intake opening toward the left of the figure.

FIG. 5 is a stepped transverse section through the vortex valve taken on the line 5—5 of FIG. 4.

FIG. 6 is a transverse section through the vortex valve taken on line 6—6 of FIG. 4.

FIG. 7 is a top schematic view of the vortex valve depicting the fluid flow pattern in the valve with the normal shock wave within the throat section of the intake at its desired normal cruise position.

FIG. 8 is a similar view to FIG. 7 depicting the fluid flow pattern in the valve when the normal shock wave within the throat section of the intake is at its designed critical position or the pressure across the throat slot has increased to a high value due to a decrease of throat Mach number.

FIG. 11 is a schematic illustration similar to FIG. 9, including the concept of an independent source of pressurized fluid and the fluid pressure differential across the terminal shock wave for actuating the fluidic switching device.

FIG. 12 is a schematic illustration similar to FIG. 9, including the concept of a reverse swirl nozzle for cancelling the swirl in the vortex chamber of the vortex valve to achieve the maximum bleed capacity of the valve and further schematically depicts the result of terminal shock wave boundary layer interaction, i.e., pressure feedback upstream for a finite distance through the boundary layer from behind the terminal shock, forcing the cruise terminal shock position to be located further downstream.

FIG. 13 is a schematic illustration similar to FIG. 10, including the concept of a reverse swirl nozzle for cancelling the swirl in the vortex chamber of the vortex valve to achieve the maximum bleed capacity of the valve and further schematically depicts the terminal shock wave located further upstream than indicated in FIG. 12 and the effect of terminal shock wave boundary layer interaction.

FIG. 14 is a schematic of a two-dimensional, or annular external compression, scoop type intake with vortex valves installed.

FIG. 15 is a schematic of an axi-symmetric or two-dimensional external compression type intake with vortex valves installed.

DESCRIPTION OF THE PREFERRED EMBODIMENTS

Figure 9:
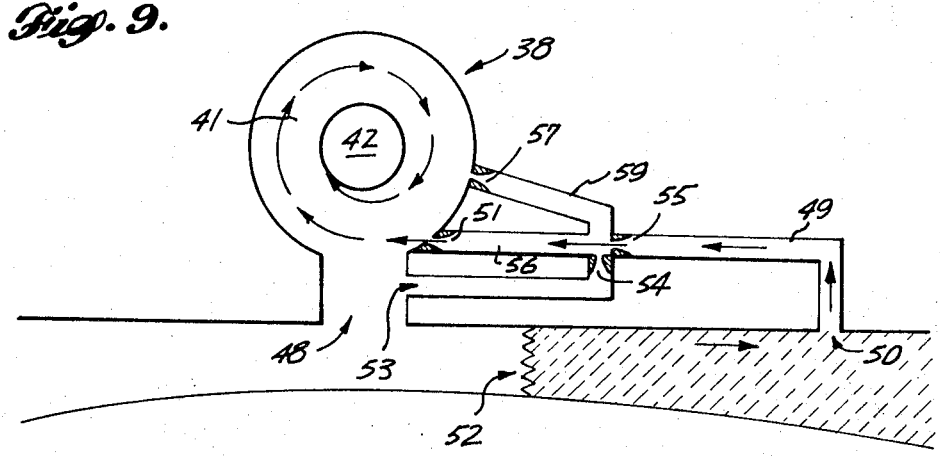
FIG. 9 is a schematic illustration with the normal shock wave at the desired cruise supercritical position downstream of the primary bleed port and shows the vortex valve control flow entering the vortex chamber tangentially and generating a swirl in the chamber, thereby cutting off the throat slot flow. Also, included is the additional embodiment of a fluidic switching device.

FIG. 1 shows the invention in combination with a supersonic fluid intake system of the external-internal or mixed compression type wherein, a variable diameter centerbody is used as shown in U.S. Pat. No. 3,295,555, issued Jan. 3, 1967, to V. L. James et al. and assigned to the common assignee. The invention could also be used in combination with a translating centerbody as shown in a copending application Ser. No. 491,222, filed Sept. 29, 1965, now U.S. Pat. No. 3,495,605 and assigned to the common assignee, or other type intake, i.e., two-dimensional, axisymmetric, asymmetric, where the shock compression occurs internally, externally, or in combination. With respect to FIG. 1, the intake is an axisymmetrical design consisting of an outer cowl, a variable diameter centerbody for throat Mach number control, and a louvered bypass system for normal shock wave control, and engine-intake fluid mass flow matching and further wherein the variable diameter centerbody system is utilized as the secondary intake control actuation means for responding to the primary or vortex valve normal shock wave position control system for initiating sufficient corrective action to avoid shock expulsion and resultant intake unstart.

The pylon 20 supports the engine pod or nacelle 21 from the undersurface of wing structure, not shown. The nacelle section forward of the engine compressor section 22 is the fluid intake section that contains a variable diameter centerbody having a spike or nose cone 23 and a laterally expandable section comprising a forward section 24, a central section 25, and an aft section 26. Each of these sections 15 is composed of edge-overlapping gores 27 and strakes 28 that can be simultaneously moved through toggle joint linkage and actuator means, not shown, to either a fully expanded or fully contracted condition for varying the geometrical throat section and the fluid mass flow condition to the engine compressor section 22 as is more clearly shown and described in U.S. Pat. No. 3,295,555. The geometrical throat section and fluid mass flow can also be varied by translating the centerbody on a fixed central support as is more clearly shown and described in copending application Ser. No. 491,222. The total fluid mass flow demand of an intake should be aerodynamically designed and sized to provide for the nominal engine fluid flow requirements, i.e., primary and secondary, plus that amount required for intake boundary layer bleed and leakage flow, cabin-air extraction, and for losses due to manufacturing and installation tolerances and other auxiliary fluid requirements. The centerbody shown in FIG. 1 is supported in cantilever fashion by a plurality of radial struts 29 extending inward from the cowl. The boundary layer fluid is removed from the surface of the centerbody through ram fluid scoop type bleed slots 30 on the nose cone, 31 forward of the expandable section, and 32 at the centerbody midsection. This boundary layer bleed fluid from the centerbody is vented overboard through bleed louvers 33 in the radial struts 29. Also, as shown in FIG. 2, the boundary layer fluid from the inner surface of the cowl is removed through a perforated skin 34 and 35 in the supersonic diffuser section and collected into cowl bleed plenums 36 from which it is discharged overboard through aft facing circumferential cowl bleed slots 37 formed in the stepped outer surface of the cowl. The vortex valve installation comprises a row of vortex valves 38 located around the cowl periphery. These valves are sized for cruise conditions to provide the required bleed capacity for decreasing the corrected engine fluid flow when needed for normal shock stability. The vortex valves are integrated into the fluid intake normal shock wave stability system as a bleed augmentation system to the main bleed system using bypass louvers 39 and subsonic diffuser inner bypass flaps 40. The inner wall bypass flaps 40 could be mechanically operated by the centerbody actuator for opening the subsonic diffuser section to the larger exit volume through the bypass louvers 39 when the centerbody contracts.

An additional feature provided by the vortex valves 38 is that, at normal intake operation or minimum flow conditions of the vortex valves, a strong vortex exists in the valve chamber 41 with which is associated a suction core in the exit nozzle 42 in which the pressures are lower than the external cowl static pressures. An additional feature which can be incorporated into the vortex valve stability system but which is not a requirement for successful operation of same, is an external flapper door 43 placed over and external to the central exit hole 42 of the vortex chamber. At normal intake operation or minimum flow conditions of the vortex valves, a strong vortex exists in the vortex valve's chamber with which is associated a vacuum or suction core in the exit nozzle in which the pressures are lower than the intake's local external cowl static pressures. The vortex valve flapper door, which is placed over the central exit will remain closed due to the suction force of the vortex vacuum core, thereby reducing intake bleed drag associated with the large intake cowl exit hole during normal operating conditions. The swirl flow, exiting from the central exit hole, will be turned into an adjacent exit swirl flow plenum with aid from the "free" vortex phenomenon and be directed overboard from the intake through a separate external outlet port. As the flow is increased through the vortex valve, due to an increase of pressure in the vortex valve primary bleed port, the strength of the vortex will diminish until the suction core is eliminated with a subsequent increase in flapper door opening.

FIG. 2 is a side view of the fluid intake section of the engine nacelle showing in greater detail the vortex valve fluid intake control system and its related mechanisms, i.e., the fluid intake boundary layer control system comprising the inner-surface cowl bleed perforations 34 forward, 35 middle and 44 aft over the bypass louvers 39 for boundary layer bleed, and as shown in FIG. 1, the centerbody annular boundary layer bleed slots 30, 31, and 32 of the ram fluid bleed scoop type wherein the bleed scoop 30 on the nose cone 23 forward the cowl lip 45 increases buzz stability margin during an intake unstart condition and bleed scoops 31 and 32 also aid in preventing boundary layer thickening that tends to reduce the throat Mach number of the intake and its tolerance to upstream fluid flow disturbances such as atmospheric gusts and airplane maneuvers. The inlet "buzz" phenomenon or oscillatory movement of the terminal shock wave can be caused by the separation of the boundary layer fluid flow on the centerbody as a result of the terminal shock boundary layer interaction and the large pressure rise across the expelled normal shock wave. This separated fluid flow chokes the intake, forcing the normal shock wave to move further upstream from the intake opening and as it moves forward, the boundary layer flow becomes reattached and the normal shock wave returns. This normal shock wave position movement or oscillation produces "buzz." The spike scoop 30 removes sufficient boundary layer fluid so that separation will not occur when the normal shock wave stands behind the scoop lip and the intake will remain in a stable unstarted position. A greater buzz suppression margin and intake Mach number tolerance before it goes supercritical can be obtained through the combined use of the vortex valves 38 and the centerbody nose cone boundary layer scoops 30 and 31 which by their additional bleed flow removal reduce the tendency for boundary layer separation and decrease the amount of external spillage flow that would otherwise be necessary to be spilled ahead of the intake cowl for buzz stability. Further, through the use of centerbody and cowling inner surface vortex generators, not shown, positioned within the variable volume and expansion ratio subsonic diffuser section of the intake, the radial pressure distortion of the fluid flow can be minimized and the extreme supercritical shock positioning prevented.

The axisymmetrical variable geometry intake obtained by means of an expanding and/or translating centerbody in an annular cowl mounted on the front of an engine, makes it easy to minimize the circumferential and radial distortion in view of its annular throat section and symmetrical design.

At the design cruise condition, the intake fluid flow matches the engine and auxiliary flow demand; whereas, at lower steady state speed conditions, the intake may deliver more fluid than is demanded from it and the excess is both spilled ahead of the intake opening and passed overboard through the open bypass system louvers 39. As shown in FIGS. 1 and 2, the intake bypass system comprises circumferential sets of three louvers 39 each and a system of built-in natural-force operated vortex valves 38 using a fluid amplifier principle of operation. For small fluid flow bypass requirements, the bypass flow reaches the bypass louvers through a perforated grill 44 which forms the aft portion of the subsonic diffuser outer wall. For larger bypass flow requirements, a circumferential row of diffuser bypass flaps 40 are opened by actuators 46 in the forward portion of the subsonic diffuser to permit more fluid to the bypass louvers 39.

During takeoff and other high engine fluid flow demands at subsonic operation, the takeoff louvers 47 open inward to the subsonic diffuser section and provide for additional fluid flow requirements. These louvers 47 can be balanced to open when static pressure at the engine face reduces below ambient pressure and help provide the amount of high quality engine flow required for takeoff conditions. Also, an actuator system can be provided to hold these louvers 47 closed, if desired, such as during a noise suppression mode of operation. In order to prevent excessive collapsing pressure loads on the cowl when in the closed condition, additional means could be provided to overpower the actuation system and open the louvers 47 when the external-to-internal pressure differential exceeded the design level.

FIGS. 3 through 6 are enlarged views of a type of pure fluid vortex valve 38 shown in FIG. 2, that is used in a normal shock wave stability system and basically comprises a cylindrical vortex chamber 41 in communication through the peripheral bleed ports or vortex valve chamber entry channels 62, with the primary bleed port inlet 48, a control fluid duct 49 for high pressure fluid from the control inlet 50 shown in FIG. 2, and a central fluid exit port 42. The vortex valves can operate successfully with exit nozzles located on both sides of the vortex chamber 41 as shown, or with only one exit nozzle located on either side of the vortex chamber as hereinafter described with reference to FIGS. 13 through 18. The advantage of two exit nozzles is to provide a larger potential bleed change through the vortex valves from minimum to maximum flow for larger terminal shock stability capability. The high pressure control flow from port 50 through duct 49 is introduced through nozzle 51 tangentially to the outer wall of the chamber 41 thereby generating a vortex within the chamber. The source of pressurized fluid 50 is at a pressure higher than the primary fluid bleed port pressure 48 when the terminal shock wave 52 is at its desired position as shown in FIG. 9. Due to the principle of the conservation of angular momentum, the tangential velocity of the fluid within the chamber 41 is amplified as the flow reaches the exit 42 on both sides of the vortex chamber as more clearly shown in FIG. 4. By adjusting the flow area of the control inlet nozzles 51 for the particular pressure levels available in the intake, sufficient swirl can be introduced in the vortex chamber 41 to produce enough back pressure on the main bleed port inlet 48 to prevent air from flowing through it.

An additional flapper door 43 can be added to the vortex valve stability system for reducing intake bleed drag charged to the vortex valve during normal, steady state intake operating conditions. The vortex valve flapper door 43 is not a requirement for successful operation of the vortex valve stability system but is simply shown as an additional embodiment to be utilized for reducing intake drag. At normal intake operation or minimum flow conditions of the vortex valve, a strong vortex exists in the vortex valve's chamber 41 with which is associated a vacuum or a suction core in the exit nozzle 42 in which the pressures are lower than the intake's local external cowl static pressures. The vortex valve flapper door 43 which is placed over the central exit 42 will remain closed due to the suction force of the vortex core thereby preventing the drag which is associated with the large cowl exit hole during normal operating conditions. The swirl flow, exiting from the control exit 42 will be turned into the exit swirl flow plenum 63, with aid from the free vortex phenomenon and be directed overboard through the external outlet port 61. As flow is increased through the vortex valve due to an increase of pressure in the vortex valve primary bleed port 49, the strength of the vortex will diminish until the suction core is eliminated with a subsequent increase in flapper door opening.

FIGS. 7 and 9 are schematic views of the normal shock wave position stability system during operation at the normal cruise operating condition wherein, the normal shock wave 52 is maintained between the primary or main throat bleed port 48 which is just forward of the design or steady state terminal shock position and the secondary or control flow bleed port 50. The pressure differential existing between the primary bleed port 48 and the secondary bleed port 50 is sufficient to operate the pure fluid vortex throttling valve 38 that functions on the principle of the conservation of angular momentum. For the vortex valve control flow, a small amount of pressurized flow maintained at a small percentage of intake captured fluid mass flow is bled through the secondary bleed port 50 from the intake section downstream of the minimum geometrical throat section and is directed through nozzle 51 to enter the vortex chamber 41 tangential to its outer periphery for generating a swirl to produce a high angular velocity gradient, radially in the chamber. Due to the principle of the conservation of angular momentum, the tangential velocity component of the fluid within the chamber 41 is amplified as the flow progresses towards the central exit 42 and this creates sufficient static pressure at the outer periphery of the vortex chamber to shut off the main bleed port flow from 48 that is being directed radially into the vortex chamber 41. By adjusting the flow area of the control entry nozzles 51 for the particular pressures available in the intake, a swirl of sufficient strength can be produced to provide sufficient back pressure on the vortex valve primary bleed entry channel. The angular momentum produced by the secondary flow exiting from tangential nozzle 51 and swirling to the exit nozzle 42, results in a high radial pressure being exerted on the primary flow entering through the throat bleed port 48 to prevent fluid from flowing therethrough. This phenomenon enables a small amount of secondary flow to control the large amount of primary flow and is termed "flow amplification." This large amplification of fluid flow or fluid amplifier in the vortex valve leads to a practical solution of the normal shock wave stability problem.

Figure 10:
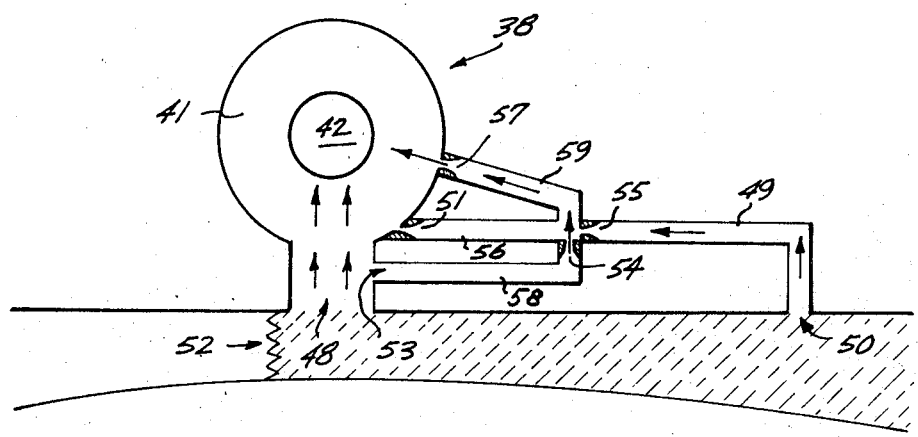
FIG. 10 is a schematic illustration similar to FIG. 9 with the normal shock wave at a critical position and shows fluid bleeding from the primary bleed port into the vortex valve as a result of the forward progression of the normal shock wave across the primary bleed port and the accompanying increased pressure in the primary bleed port.
Figure 16:
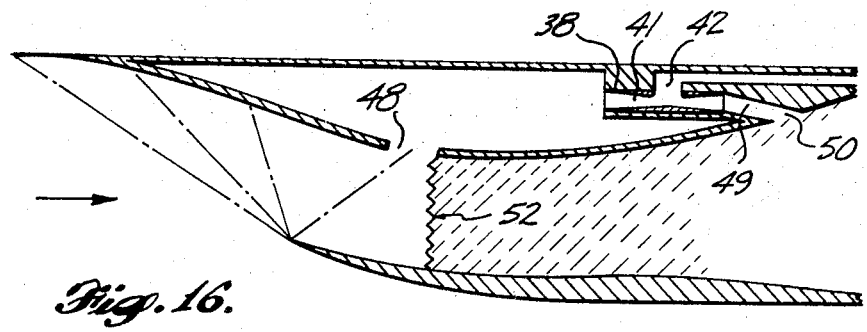
FIG. 16 is a schematic of a two-dimensional or axisymmetric, mixed compression intake with vortex valves installed.
Figure 17:
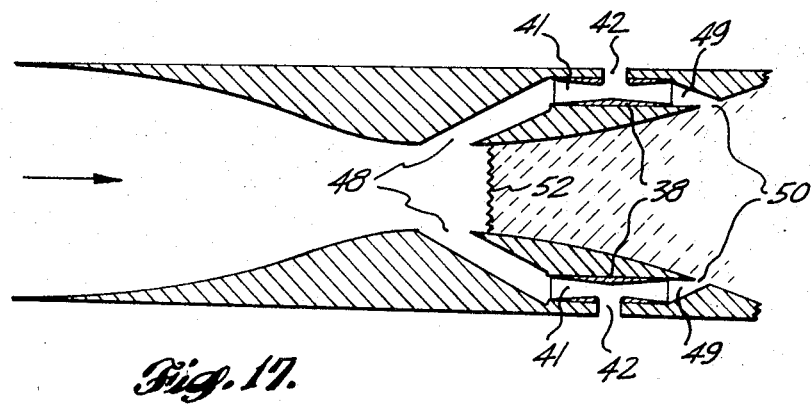
FIG. 17 is a schematic of a two-dimensional or axisymmetric, internal compression type intake with vortex valves installed.

FIGS. 8 and 10 are schematic views of the normal shock position stability system during operation at critical intake operating condition and shows that when there is a fluid flow disturbance to the intake upsetting the delicate mass flow continuity balance where more flow is being supplied by the intake than can be taken away, the normal shock wave 52 will progress towards the intake entrance and as it crosses the primary bleed port 48, the pressure rises in the primary bleed port 48 and the differential pressure ratio across the valve is decreased which in turn decreases the strength of the vortex swirl and angular velocity gradient in the chamber 41. This reduction in vortex strength and resultant decrease in the static to total pressure ratio across the primary bleed entry channels 62, allows the intake flow to be bled through the primary or throat bleed port 48 in an amount proportional to the change in pressure ratio across the valve, i.e., as a pressure ratio function of the primary bleed port pressure 48 to the secondary control flow pressure 50.

The pressure rise in the primary bleed port 48 does not have to be derived from the normal or terminal shock 52 passing over the primary bleed port 48, however. The pressure rise can also result from a reduction of intake fluid flow Mach number in the region of the primary bleed portion 48 as a result of an upstream or external disturbance to the flow captured by the intake, i.e., decrease in Mach number flow entering the intake. In addition, the pressure rise can be impressed on the primary bleed port 48 as a result of the forward movement of the normal or terminal shock 52, even before the actual terminal shock arrives at the primary bleed port 48. This is due to the normal shock boundary layer interaction and resultant pressure feedback forward through the intake wall boundary layer existing for a finite distance upstream from the normal shock location. As a result of the normal shock boundary layer interaction phenomenon and resultant pressure feedback through the boundary layer it is possible to locate the primary bleed port 48 straddling or upstream of the geometric throat of the intake and utilize the vortex valve stability system for increasing the intake's tolerance to both upstream and downstream flow disturbances without having to duplicate the vortex valve stability system in the same intake for controlling both types of intake fluid flow disturbances.

A fluidic switching device for the secondary control flow entering the vortex valve chamber, employing the pressure rise across the intake primary bleed port for its operation, can be utilized to achieve maximum flow capacity through the vortex valve, resulting in greater terminal shock stability. The maximum flow capacity through the vortex valve 38 and overboard from the vortex chamber outlet port 42 through the vortex valve cowl exit port 61 into the free stream flow is not realized, until the swirl in the vortex chamber 41 is eliminated or until only radial flow or flow normal to the swirl flow exists in the chamber. Generally, due to the intake's diffusion characteristics, the pressure rise in the vortex chamber at critical intake condition, is not sufficient to throttle the tangential secondary control flow through nozzle 51, or to completely eliminate the swirl in the vortex chamber 41. But, by utilizing the additional embodiment of a fluidic momentum interaction device or a fluidic control switching device in series with the secondary control flow nozzle, the swirl in the vortex chamber can be minimized. The fluidic switching device is basically a fluidic monostable valve which relies on fluid momentum interaction with the secondary control flow developed from increase of the intake's primary bleed port pressure so as to channel the secondary control flow entering the vortex chamber to a direction such that the tangential velocity component of the swirl in the vortex chamber is minimized or reduced or zero. The fluidic switching device is schematically shown in FIGS. 9 and 10 as comprising the throat slot port 53 and the control jet deflector nozzle 54 positioned normal to the tangential power fluid stream output flow through nozzle 55 from the secondary bleed port 50 through conduit 49. Through the principle of momentum interaction the tangential vortex valve control flow passing through tangential output leg 56 and tangential output leg nozzle 51, can be fully modulated, and the optimum vortex valve turndown ratio realized. As indicated in FIGS. 9 and 10, the vortex valve control flow coming from secondary bleed port 50 through conduit 49 to control flow jet 55, can be switched from the tangential output leg 56 to the radial output leg 59 by taking advantage of the increase in pressure of the throat bleed flow passing through primary bleed port 48 as the normal shock wave moves to the critical position as shown in FIG. 10 or as the pressure rises in the primary bleed port due to a decrease in local Mach number at the primary bleed port. A portion of the throat bleed flow through 48 is directed through the port 53 and conduit 58 to the control jet deflector nozzle 54 from which it exits to interact with the vortex valve control flow from nozzle 55. The resulting momentum interaction causes the deflection of the control flow jetstream into the radial output leg 59. This control flow, being directed radially into the vortex chamber through nozzle 57 and normal to the vortex swirl can reduce the vortex in the chamber to zero, thereby utilizing the full fluid mass flow capacity of the vortex valve by allowing the maximum amount of bleed flow through the main throat slot 48. Thus, the excess flow of the intake will be bypassed overboard from the vortex valve outlet port 42 through the vortex valve cowl exit port 61 before it reaches the engine section, and the forward progression of the normal shock wave 52 will be halted to permit the intake to remain started. Also, if the intake is operating in an external compression mode, greater buzz stability and restart capability will be provided.

FIG. 11 is a schematic view of a further embodiment of the terminal shock wave stability system shown in FIGS. 9 and 10, wherein, a source of pressurized fluid is utilized for creating the power fluid stream, and the differential pressure across the shock wave is directed normal to the power fluid stream for fluidic momentum interaction to control its entry channel to the vortex chamber. The pressurized fluid to power nozzle 55 is supplied from a source of pressurized fluid having a pressure higher than the primary bleed port pressure 48 when the terminal shock wave 52 is at its desired position. The fluid receiver conduit 56 is spaced from and divergently aligned with power nozzle 55 to receive the power fluid stream and inject it through the nozzle 51 tangentially into the chamber 41 to generate a rotational fluid stream in the chamber. When the terminal shock wave is at its desired position, the rotational fluid stream exerts sufficient force against the stream of fluid flowing into the chamber through the main input channel 48, to throttle the primary bleed port flow through the output channel 42. A second fluid receiver conduit 59 is spaced from and axially aligned with power nozzle 55 to receive the power fluid stream when the deflecting pressure jet means from nozzle 54 directs a control stream transversely against the power fluid stream to snap the power stream flow toward the second receiver conduit 59 when the terminal shock wave moves upstream from its desired position. The fluid in receiver conduit 59 is injected through nozzle 57 radially into the chamber to destroy the rotational fluid stream in the chamber 41, thereby permitting fluid to flow through the primary bleed port 48 and through the output channel 42.

FIGS. 12 and 13 are schematic views of the terminal shock wave position stability system during operation at conditions similar to FIGS. 9 and 10 respectively. FIGS. 12 and 13 show the additional embodiment of a fluidic momentum interaction device or a fluidic control switching device that differs from that shown in FIGS. 9, 10 and 11, in that if more than one secondary bleed tangential nozzle 51 is utilized, the nozzle 60 of the fluidic control switching device can be directed to a reverse swirl direction to cancel the opposing swirl from the complimentary tangential nozzle 51. By utilizing this embodiment, a fluidic control switching device would not be required for each secondary bleed tangential nozzle 51 to realize maximum flow capability from the vortex valve. FIGS. 12 and 13 also indicate how a pressure rise is impressed on the primary bleed port 48 as a result of the forward movement of the intake's normal or terminal shock wave, even before the actual shock wave arrives at the primary bleed port 48. This results from a combination of the terminal shock boundary layer interaction and fluid momentum deficiency in the boundary layer which results in compressive turning of the supersonic fluid flow extending upstream from the terminal shock wave 52. Pressures P3 along the wall of the intake for a short distance upstream of the terminal shock will be higher than the static pressure in the potential or inviscid flow region P1. Since this phenomenon exists in any practical intake application, the primary bleed port of the vortex valve terminal shock stability system is able to be located a certain distance upstream of the intake's geometric throat and thereby have the capability of responding to both upstream and downstream disturbances. This enable the vortex valve terminal shock stability system to provide terminal shock stability for both upstream and downstream disturbances without having to resort to two separate vortex valve stability systems.

FIGS. 14 through 18 are schematic illustrations of various types of intakes wherein the general aerodynamic concepts of the vortex valve terminal shock wave position stability control system and its particular features as previously described herein, can also be applied in whole or in part to these intakes, although the particular mechanical design and shapes may differ.

Figure 18:
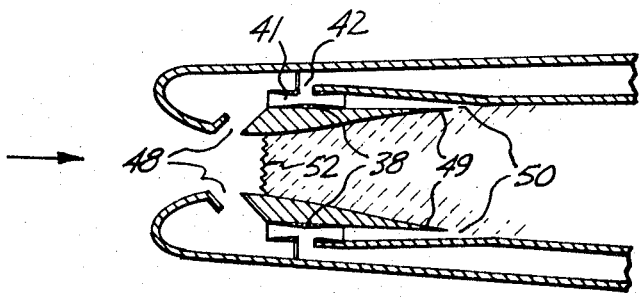
FIG. 18 is a schematic of a two-dimensional or axisymmetric subsonic intake with vortex valves installed for stabilizing the terminal shock during noise abatement.

FIG. 18 is a further embodiment of the present invention in a subsonic intake to prevent unchoking of the intake's throat during a noise abatement mode of operation. For intakes operating in the subsonic mode with a choked throat for noise abatement, a terminal shock is formed downstream of the throat similar to that shown in FIGS. 17 and 18.

The vortex valve normal shock wave stability system is sized to bypass the amount of fluid flow required for normal shock stability, taking into consideration the response time of the intake's primary control system. If the vortex valve stability bleed system for the excess flow is not provided, either the propulsion system performance must be downgraded or the intake's tolerance to internal or external fluid mass flow disturbances would be reduced, due to the inherently slower response of the intake's primary control system in taking corrective action to intake flow disturbances. If the intake should unstart, the vortex valve stability system inherently provides a larger buzz stability margin and easier and faster restart capability than if no vortex valve stability system were employed. Likewise for intake types, essentially external compression in nature, the vortex valve stability system provides large buzz stability margins without reliance on movement of control surfaces. For intakes operating in the subsonic mode with a choked throat for noise abatement, a normal shock is formed downstream of the throat similar to that shown in FIGS. 17 and 18. For this condition, a vortex valve stability system can be employed for stabilizing the normal shock, thereby preventing unacceptable distortion and turbulence levels at the engine face, as well as for maintaining noise abatement by preventing unchoking of the intake's throat. If the pressures external of the intake exceed the pressures inside of the intake, it may be necessary to provide some means for removing the vortex valve bleed flow such as an ejector.

While the invention has been disclosed with reference to certain embodiments, it is to be understood that those modifications and changes which become obvious to a person skilled in the art as a result of the teachings hereof will be encompassed by the following claims.

What is claimed is:

1. A system for stabilizing the fluid flow within an intake having a terminal shock wave comprising: a vortex valve; the intake having a fluid bypass upstream of the terminal shock communicating through said vortex valve; means for sampling a first fluid pressure downstream of the terminal shock for establishing a vortex flow in said vortex valve; means for sampling a second fluid pressure upstream from the terminal shock; a fluidic comparator for comparing corresponding characteristics of the two applied fluids and producing an output in accordance with the comparison; and means responsive to the output of said comparator for controlling the fluid within the intake by establishing a vortex flow to throttle the fluid bypass flow through the vortex valve in accordance with a predetermined pressure ratio between said first and second fluid pressures and destroying the vortex flow to permit bypass flow through the valve when the pressure ratio is changed.

2. In a fluid intake for a jet engine having a terminal shock wave, the combination comprising: a fluidic throttling valve having a vortex chamber with a main fluid input channel and a fluid output channel communicating therewith; the fluid intake having a primary bleed port upstream from the desired position of the terminal shock wave and communicating with the main fluid input channel of said chamber; first means for generating a rotational fluid stream in said chamber; said rotating stream exerting a force on the stream of fluid entering said chamber through the main fluid input channel, said force exerted on said fluid stream being sufficient to throttle the primary air bleed port flow from flowing through the output channel; second means including a secondary bleed port downstream from the primary bleed port for directing fluid into said chamber to generate a fluid stream in said chamber generally in the opposite direction of flow of said first means to counteract the rotational fluid stream in said chamber when a predetermined normal operating pressure ratio between the primary bleed port pressure and the secondary bleed port pressure is changed thereby permitting the primary bleed port flow through the output channel.

3. In a fluid intake for a jet engine having a terminal shock wave, the combination comprising: a fluidic throttling valve having a vortex chamber with a main fluid input channel and a fluid output channel communicating therewith; the fluid intake having a primary bleed port upstream form the desired position of the terminal shock wave and communicating with the main fluid input channel of said chamber; means for establishing a power stream of fluid in a predetermined path, a first fluid receiver adapted to receive the power fluid stream and inject it into the chamber to generate a rotational fluid stream in said chamber said rotational fluid stream exerting sufficient force against the stream of fluid flowing into chamber through said main input channel to throttle the primary bleed port flow through the output channel; a second fluid receiver adapted to receive the power fluid stream and inject it into the chamber to destroy the rotational fluid stream in said chamber; the fluid intake having a fluid pressure tap downstream from the primary bleed port; deflecting pressure jet means communicating with said fluid pressure tap and adapted to direct a control stream against the power fluid stream to direct the power stream flow toward the second fluid receiver when a predetermined normal operating pressure ratio between the primary bleed port pressure and the fluid pressure tap is changed thereby permitting the primary bleed port flow through the output channel.

4. In a fluid intake for a jet engine having a terminal shock wave, the combination comprising: a fluidic throttling valve having a vortex chamber with a main fluid input channel and a fluid output channel communicating therewith; the fluid intake having a primary bleed port upstream from the desired position of the terminal shock wave and communicating with the main fluid input channel of said chamber; means including a nozzle for establishing a power fluid stream; a first means for receiving the power fluid stream and injecting it into the chamber for generating a rotational fluid stream in said chamber; said rotating stream exerting a force on a stream of fluid flowing into said chamber through said main input channel, said force exerted on said fluid stream being sufficient to throttle the primary air bleed port flow from flowing through the output channel; fluid-deflecting means adapted to direct a control stream against the power fluid stream; the fluid intake having a fluid pressure top downstream from the primary bleed port, said fluid pressure tap communicating with said fluid deflecting means; a second means for receiving the power fluid stream and directing it into a particular output channel for injection into the chamber to shear the rotational flow and thereby diminish the rotational fluid stream in said chamber when a predetermined normal operating pressure ratio between the primary bleed port pressure and the fluid pressure tap is changed thereby permitting the primary bleed port flow through the output channel.

5. In a fluid intake for a jet engine having a terminal shock wave, the combination comprising: a fluidic throttling valve having a vortex chamber with a main fluid input channel and a fluid output channel communicating therewith; the fluid intake having a primary bleed port upstream from the desired position of the terminal shock wave and communicating with the main fluid input channel of said chamber; means including a nozzle for establishing a power fluid stream; a first receiver means being spaced from and aligned with said nozzle for receiving pressurized fluid flow from said nozzle and having an outlet port for injecting fluid into the chamber to generate a rotational fluid stream in said chamber; said rotating stream exerting a force on a stream of fluid flowing into said chamber through said main input channel, said force exerted on said fluid stream being sufficient to throttle the primary air bleed port flow from flowing through the output channel; a second receiver means being spaced from and divergently aligned with said supply nozzle and having an outlet port for injecting fluid into said chamber to shear the rotational flow; a fluidic control switching device; the fluid intake having a fluid pressure tap downstream from the primary bleed port and communicating with said fluidic control switching device for creating a deflecting pressure jetstream; said fluidic control switching device being positioned in the spaced apart region between the supply nozzle and the first and second receiver means and adapted to direct the deflecting pressure jetstream against the power fluid stream for exerting a force on said stream of fluid flowing through said first receiver means to snap the flow from the supply nozzle toward the second receiver means when a predetermined normal operating pressure ratio between the primary bleed port pressure and the fluid pressure tap is changed and thereby shear the rotational flow in said chamber to diminish the vorticity force and permit the primary bleed port flow through the output channel.

6. In a fluid intake for a jet engine wherein a terminal shock wave is produced in the fluid flowing through the intake, the combination comprising: a fluidic throttling valve having a vortex chamber with a main fluid input channel and a fluid output channel communicating therewith; the fluid intake having a primary bleed port upstream from the desired position of the terminal shock wave and communicating with the mainfluid input channel of said chamber; means including a supply nozzle for establishing a power fluid stream output; a first receiver means being spaced from and axially aligned with said supply nozzle for receiving said power fluid stream from said nozzle; said first receiver means having an outlet port for directing said power fluid stream into said chamber to create a tangential velocity component; said tangential velocity component providing a peripheral chamber pressure acting against the primary bleed port pressure to throttle the primary bleed port flow through the central exit port; a second receiver means adjacent said first receiver means and being spaced from and divergently aligned with said supply nozzle; said second receiver means having an outlet port for directing pressurized fluid into said chamber to oppose the fluid stream created by said first receiver means a fluidic control switching device; the fluid intake having a fluid pressure tap downstream from the primary bleed port and communicating with said fluidic control switching device for creating a deflecting pressure jetstream; said fluidic control switching device being positioned in the spaced-apart region between the supply nozzle and the first and second receiver means and adapted to direct the pressure jetstream against the power fluid stream for exerting a force on said stream of fluid flowing through said first receiver means to snap the flow from the supply nozzle toward the second receiver means when a predetermined normal operating pressure ratio between the primary bleed port pressure and the fluid pressure tap is changed and thereby counteract the tangential velocity component in said chamber and permit the primary bleed port flow through the output channel.

7. In an internal compression, supersonic fluid intake for a jet engine wherein a terminal shock wave is produced in the fluid flowing through the throat section of the intake the combination comprising: a fluidic vortex throttling valve having a cylindrical vortex chamber with a peripheral inlet port for directing fluid into said chamber to create a vortex a main fluid input channel normal to the vortex and a central fluid exit port for directing fluid to the exterior of the intake; the fluid intake having a primary bleed port within the throat section of the intake upstream from the desired operating position of the terminal shock wave, said primary bleed port communicating with the main fluid input channel of said cylindrical vortex chamber for bypassing some of the inlet flow from the throat section through the vortex valve the fluid intake having a secondary bleed port downstream of the primary bleed port said secondary bleed port having a pressure higher than the primary bleed port pressure when the terminal shock wave is at its desired position; a supply nozzle having a power fluid stream output supplied from said secondary bleed port a first receiver means being spaced from and axially aligned with said supply nozzle for receiving said power fluid stream from said nozzle said receiver means having an outlet port nozzle means communicating with the peripheral inlet port of the cylindrical chamber for directing said power fluid stream into said chamber to create a tangential velocity component said tangential velocity component providing a peripheral chamber pressure exerting sufficient force against the stream of fluid communicating with the main fluid input channel normal to the vortex of said cylindrical vortex chamber to throttle the primary bleed port flow through the central exit port of said vortex valve; a second receiver means adjacent said first receiver means and being spaced from and tangentially aligned with said supply nozzle; said second receiver means having an outlet port for directing pressurized fluid into said chamber to shear the rotational flow and thereby diminish the vortex force flow in said chamber and permit the primary bleed port flow through the central exit port; a fluidic control switching device; the fluid intake having a fluid pressure tap upstream from the desired position of the terminal shock wave and communicating with said fluidic control switching device for creating a deflecting pressure jet stream; said fluidic control switching device being positioned in the spaced apart region between the supply nozzle and the first and second receiver means and adapted to direct the deflecting pressure jet stream against the power fluid stream for exerting a force on said stream of fluid flowing through said first receiver means to snap the flow from the supply nozzle toward the second receiver means when a predetermined normal operating pressure ratio between the primary bleed port pressure and the secondary bleed port pressure is changed and thereby counteract the tangential velocity component in said chamber and permit the primary bleed port flow through the vortex valve.

8. In a fluid intake for a jet engine having a terminal shock wave, the combination comprising: a fluidic throttling valve having a vortex chamber with a main fluid input channel and a fluid output channel communicating therewith; the fluid intake having a primary bleed port upstream from the desired position of the terminal shock wave and communicating with the main fluid input channel of said chamber; a source of pressurized fluid downstream from the desired position of the terminal shock wave; a first nozzle means supplied from said source of pressurized fluid and adapted to inject a stream of fluid into the chamber to generate a rotational fluid stream in said chamber said rotational fluid stream exerting sufficient force against the stream of fluid flowing into said chamber through said main input channel to throttle the primary bleed port flow; a power nozzle supplied from said source of pressurized fluid for issuing a power fluid stream in a predetermined path; a first fluid receiver means adapted to receive the power fluid stream; a second nozzle means communicating with said first fluid receiver means for injecting the power fluid stream into the chamber in the same direction of rotational flow as said first nozzle means; a second fluid receiver means adapted to receive the power fluid stream; a third nozzle means communicating with said second fluid receiver means for injecting the power fluid stream into the chamber counter to the direction of fluid flow of said first nozzle means to destroy the vortex flow in said chamber; the fluid intake having a fluid pressure tap downstream from the primary bleed port; a fluidic control switching device communicating with said fluid pressure tap and adapted to direct a control stream transversely against the power stream to snap the power stream flow toward the second fluid receiver means when a predetermined normal operating pressure ratio between the primary bleed port pressure and the fluid pressure tap is changed thereby permitting the primary bleed port flow through the output channel.

* * * * *